United States Patent [19]
Thiel et al.

[11] 4,107,763
[45] Aug. 15, 1978

[54] LAMP ADAPTING KIT

[75] Inventors: William A. Thiel, Chicago; Harry Dziedzic, Glenview, both of Ill.

[73] Assignee: Rank Precision Industries, Inc., Des Plaines, Ill.

[21] Appl. No.: 745,382

[22] Filed: Nov. 26, 1976

[51] Int. Cl.² .............................................. F21V 7/04
[52] U.S. Cl. ..................................................... 362/32
[58] Field of Search .................... 240/10 R, 3, 25, 84, 240/81, 1 LP, 11.2, 1 R, 10 B, 10 L; 350/96 R

[56] References Cited
U.S. PATENT DOCUMENTS

| | | | |
|---|---|---|---|
| 2,905,808 | 9/1959 | Wince | 240/84 X |
| 3,056,021 | 9/1962 | Jacobsen | 240/10 R |
| 3,321,619 | 5/1967 | Dailey | 240/3 X |
| 3,366,785 | 1/1968 | Huber | 240/25 X |
| 3,564,231 | 2/1971 | Bruce et al. | 362/32 |
| 3,590,237 | 6/1971 | Winters et al. | 240/25 X |
| 3,638,012 | 1/1972 | Lenz et al. | 240/25 |
| 3,721,815 | 3/1973 | Wall | 240/10 R |
| 3,891,841 | 6/1975 | Codrino | 240/1 LP |
| 3,895,226 | 7/1975 | Murray et al. | 240/25 X |

*Primary Examiner*—R. L. Moses
*Attorney, Agent, or Firm*—James & Franklin

[57] ABSTRACT

A kit for adapting a flame-producing lamp to electrical use by mounting on the lamp a fiber optic bundle having a portion shaped to simulate a flame and a lamp for illuminating that bundle at a position remote from its shaped portion.

28 Claims, 4 Drawing Figures

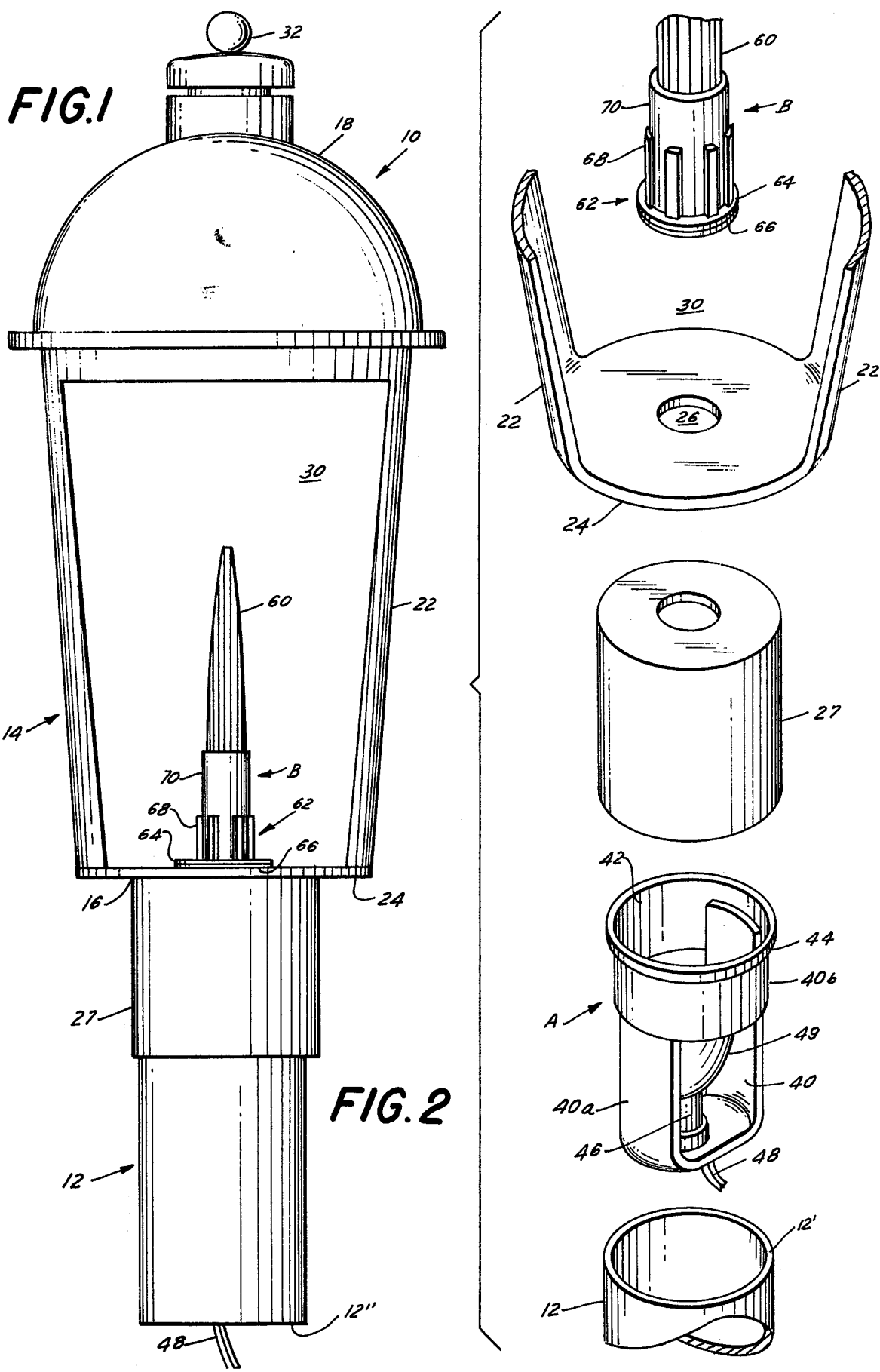

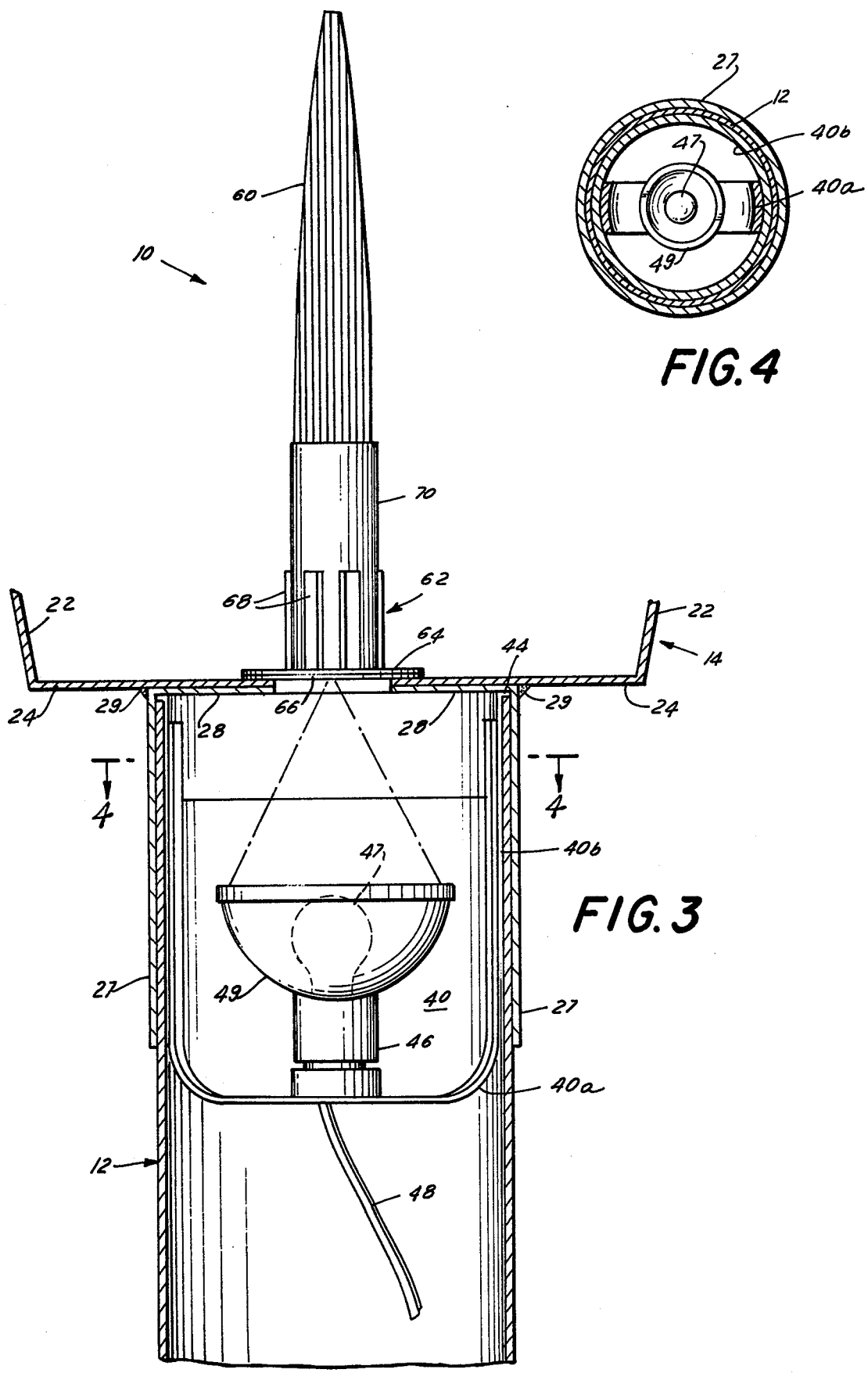

LAMP ADAPTING KIT

BACKGROUND OF THE INVENTION

The present invention relates to a kit for adapting a flame-producing lamp to electrical use, and more particularly to such a kit which enables an combustion lamp to be adapted to electrical operation while retaining the characteristic appearance of a flame.

While kerosene, oil, gas and other flame-producing fuel-fed lamps are no longer in vogue for a number of utilitarian reasons (including safety and the fuel crisis), they have lost none of their appeal from an aesthetic point of view. While it is a relatively simple matter to convert a flame-producing fuel-fed lamp to an electrically operated lamp, the fact remains that an electric bulb — however shaped and whether it be of the incandescent, neon or glow type — fails to match in aesthetic appeal the characteristic flame associated with combustion lamps.

Accordingly, it is an object of the present invention to provide a kit for adapting a flame-producing fuel-fed lamp into an electrically operated lamp.

Another object is to provide such a kit which enables the characteristic appearance of the flame associated with the original lamp to be maintained in the adapted lamp despite the absence of any actual flame therein.

A further object is to provide such a kit which does not require the use of any mechanical fasteners (such as screws or nuts and bolts) during the adapting process.

It is also an object to provide such a kit which permits the modification from fuel to electrical usage without detracting from the aesthetic appearance of the lamp.

It is another object to provide an electric lamp affording the appearance of flame illumination.

SUMMARY OF THE INVENTION

It has now been found that the above and related objects of the present invention are obtained in a kit for adapting to electrical use a flame-producing fuel-fed lamp comprising a hollow post and a hollow lantern mounted on the post. Broadly speaking, the kit comprises adaptor means and illuminating means. More particularly the adaptor means comprises a chamber defining a non-opaque portion and means for mounting the chamber on the post. The illuminating means comprises a fiber optic bundle and means for mounting the bundle on the lantern. The fiber optic bundle has a first end configured and dimensioned to resemble a flame and a second end, the mounting means being adapted to mount the bundle on the lantern with the bundle second end aligned with the non-opaque chamber portion.

Preferably the chamber and the illuminating means are configured and dimensioned to be received within the post and within the lantern, respectively. In this instance generally the non-opaque chamber portion is disposed at the top of the chamber and the bundle second end is disposed at the bottom of the bundle.

In a preferred embodiment the chamber mounting means comprises an outwardly extending lip at the top of the chamber configured and dimensioned to extend over the top of the post, so that the adaptor means is mountable on the post without mechanical fasteners, and the bundle mounting means comprises a non-opaque base having adhesive backing on a portion thereof so that the bundle mounting means is mountable on the lantern without any mechanical fasteners. Naturally the non-opaque base portion is aligned with both the non-opaque chamber portion and the bundle second end portion. The bundle comprises a plurality of generally parallel extending optical fibers (such as may be formed of glass or plastic). The bundle first end is preferably tapered inwardly and the periphery of the bundle first end is comprised of the first end surfaces of the optical fibers so that, for at least some of the optical fibers, the opening at the first end thereof has a greater surface then the opening at the second end thereof.

Another embodiment of the present invention is a lamp comprising a longitudinally extending frame, a light source mounted adjacent one end of the frame, and a longitudinally extending bundle of parallel optical fibers mounted adjacent the other end of the frame. One end of the bundle is optically aligned with the light source and the other end of the bundle is substantially tapered so that the end surfaces of at least some of the optical fibers are greater adjacent the aforementioned one bundle end then adjacent the other bundle end.

BRIEF DESCRIPTION OF THE DRAWING

FIG. 1 is a side elevation view of a lamp according to the present invention;

FIG. 2 is a fragmentary exploded view of pertinent components of FIG. 1;

FIG. 3 is a fragmentary side elevation view, partially in cross-section, of the lamp of FIG. 1; and FIG. 4 is a cross-section view taken along the line 4—4 of FIG. 3;

DETAILED DESCRIPTION OF THE PREFERRED EMBODIMENTS

Referring now to the drawing, therein illustrated is a lamp generally designated 10 according to the present invention. The lamp 10 was originally a gas lamp including a hollow post, generally designated 12, and a hollow lantern, generally designated 14, removably mounted on the post 12. The function of the post 12 was merely to support the lantern 14 and connect the interior thereof to an external gas supply; accordingly the post 12, herein illustrated as a simple hollow cylinder, could define any of a variety of other external peripheral configurations so long as the internal configuration defined a gas-tight passageway connecting the lantern interior with the external gas supply. In some instances the post 12 was desired primarily for aesthetic purposes and was merely a covering for a length of pipe which extended from the external gas supply into the lantern 14, the pipe (not shown) being the actual gas passageway.

Like the post 12, the lantern 14 could be made in a variety of configurations and dimensions. A typical lantern 14 included a base 16, a dome 18, and one or more intermediate structural members 22 for spacing the dome 18 above the base 16. The lantern base 16 typically comprised a horizontally extending member 24 defining a central aperture 26 therethrough (see FIG. 3) and a downwardly extending flange 27 configured and dimensioned to be removably seated over the post top 12′. Where the top portion of the post 12 was cylindrical (as shown), the downwardly extending lantern flange 27 was also cylindrical (as shown) and adapted to snug fit the outer diameter of the post 12. The lantern base aperture 26 was, of course, smaller than the outer diameter of the post top 12′ so that the post top 12′ supported the lantern base 24 and limited the degree to which the lantern 14 could slide down the post 12. While the downwardly extending flange 27 and the horizontal extending member 24 could be fabricated in a one piece integral construction, frequently the horizontally extending member 24 and the downwardly extending flange 27 were separately fabricated (as shown). In this instance the downwardly extending flange 27 included at the top thereof an inwardly extending portion 28 and the horizontally extending member 24 and the inwardly extending portion 28 were secured together, for example, by spot welds 29 (see FIG. 3).

The structural spacing members 22 were provided with apertures 30 to allow the light generated within the lantern 14 to pass outwardly. Where alternate means were provided for the escape through the dome 18 of the heat generated by the combustion of the fuel, the apertures 30 were in some instances covered by a non-opaque material (not shown).

The dome 18 was also available in a variety of configurations, including a hemispherical section (as shown). The inside of the dome 18 was typically polished or provided with a reflector so that light impinging on the inner surface of the dome 18 was reflected downwardly and, hopefully, outwardly through the illumination apertures 30. The dome 18 typically included a handle 32 by which the lantern 14 could be grasped for easy removal from the post 12. The dome 18, the structural spacing members 22, and the horizontally extending base member 24 were typically provided as a one piece structural unit, as shown.

Kerosene and oil lamps were essentially of similar construction to gas lamps, except that the bottom of the post defined a reservoir for holding the fuel to be burned and wick means were provided for carrying the fuel from the reservoir through the lantern aperture 26 into the lantern 14 where combustion occurred.

The kit for adapting to electrical use the lamps described above includes adaptor means, generally designated A, and illuminating means, generally designated B. The adaptor means A comprises a chamber 40 defining a non-opaque top portion or aperture 42 and means 44 for mounting the chamber 40 within the post 12. The chamber is configured and dimensioned to be received within the post 12 and may, for example, comprise a U-shaped bottom portion 40a and a cylindrical upper portion 40b, as shown. The chamber mounting means comprises an outwardly extending lip 44 of the chamber upper portion 40b configured and dimensioned to extend over the post top 12' so that the bottom of the lip 44 rests on the post top 12'. The chamber 40 is provided with a socket for an electric light source, for example, the socket 46 extending upwardly from the base of the U-shaped member 40a and adapted to receive an electric light bulb 47. Preferably the bulb 47 contains a reflector 49 to direct the illumination upwardly towards the lantern base aperture 26. Secured to the socket 46 are means for electrically connecting the socket 46 to a power supply (not shown) for example, a wire 48. Wire 48 may extend to any electrical power supply, such as a wall outlet or pattern, and may either be connected directly to the power supply or to the output leads of a transformer designed to convert the available power supply to that required for the socket 46.

It will be recognized that the adaptor means A may be placed in the post 12 with the lip 44 resting on the post top 12' without the use of any mechanical fasteners such as nuts and bolts or screws. All that is required is to remove the lantern 14 from the post 12, remove or push aside from the area to be occupied by the adaptor A any gas-transporting pipe or oil-transporting wick disposed within the post 12, and drop the chamber 40 into the post 12. Once the lantern 14 has been repositioned on the post 12, the lip 44 is locked into place intermediately horizontally extending lantern member 24 and the post top 12'. When the lamp is to be adapted to battery operation, the battery and any transformer required may be also disposed within the post 12 below the chamber 40; when the lamp is to be adapted for connection to a wall outlet, the wire 48 may be threaded out of the aperture in the post bottom 12", through which the gas pipe previously passed (or, in the case of oil or kerosene fueled lamp, whatever opening was used to introduce kerosene or oil into the post reservoir).

The illuminating means B comprises a fiber optic bundle 60 and means generally designated 62 for mounting the bundle in the lantern with one end thereof aligned with the non-opaque chamber portion. More particularly, the bundle mounting means 62 comprises a non-opaque base or horizontally extending member 64 having on the bottom surface thereof an adhesive backing 66 for securing the mounting means 62 to the upper surface of the lantern base 24 and on the upper surface thereof a series of upwardly-extending fingers or prongs 68 for securing the ferrule 70 on the lower end of the bundle 60 to the base 64. In the kit the lower surface of the adhesive backing 66 is covered with a release paper (not shown) adapted for easy removal from the backing 66 immediately prior to use of the bundle mounting means 62. While it is convenient to form the entire mounting base 64 of non-opaque material (i.e., light transmissive material), it is only necessary that there be a non-opaque portion or aperture disposed directly underneath the lower end of the bundle 60 and that the base 64 be mounted on the lantern base 24 with the non-opaque base portion or aperture disposed directly above the lantern base aperture 26, thereby to provide a travel path for light from the light source 47 to the bundle lower end. If the appearance of a colored flame is desired, the non-opaque base portion may be appropriately tinted.

The fiber optic bundle 60 comprises many parallel-oriented slender hollow rods of glass or plastic, each rod being capable of transmitting light from one end to the other end without loss of light from the sidewalls. The lower end of the bundle 60 is seated within a ferrule 70 secured to the base 64 by means of the fingers 68. The upper end of the bundle 60 is shaped and dimensioned to simulate a flame, and the upper ends of the fibers are exposed at the upper end of the bundle. In a particular embodiment selected to illustrate the present invention the vertically extending bundle 60 is substantially tapered upwardly and inwardly so that, for at least some of the optical fibers, the opening at the top end thereof has a greater end surface then the opening at the bottom end thereof — in other words, the rods extend vertically with the bottom ends being inclined relative to the horizontal, generally upwardly and inwardly towards the center of the bundle. It will be noted that the illumination from the bundle 60 comes not from the rod sidewalls, but from the upper ends. This permits a realistic flame-like appearance to be obtained.

The configuration of the bundle 60 may, of course, be varied in order to produce other flame-simulating effects without departing from, but rather fostering, the objectives of this invention. For example, the fibers at their upper ends may be arranged differently from their lower ends, the upper ends of the fibers may be bent outwardly rather than being essentially vertical as here specifically disclosed, the side configuration of the upper end of the bundle may be irregular or wavy or otherwise depart from the essentially structural conical configuration here specifically disclosed, all to ensure that the light emanating from the upper ends of the fibers of the bundle 60 produce the overall visual impressions of a flame. It will be appreciated that natural flames themselves take various shapes, a candle flame being conical and an illuminating gas lamp flame often being wide and flat, for example, and the fiber bundles designed to simulate those and other flame shapes will be appropriately configured.

It will be recognized that the illuminating means B may be mounted in the lantern 14 without the use of any mechanical fasteners such as nuts and bolts or screws. All that is required is to remove the release paper from adhesive backing 66, position the mounting base 64 over the lantern base 24 with the non-opaque portion of mounting base 64 aligned with or centered over lantern base aperture 26, and press the adhesive backing 66 against the lantern base 24.

To summarize, the present invention provides a kit for adapting to electrical use a flame-producing fuel-fed lamp while maintaining the characteristic flame appearance of the original lamp. The kit enables the kit components to be mounted on the original lamp without the use of any mechanical fasteners.

Now that the preferred embodiments of the present invention have been shown and described in detail, various improvements and variations thereon will become readily apparent to those skilled in the art. Accordingly, the scope of the present invention is to be limited only by the appended claims, and not by the foregoing disclosure.

We claim:

1. A kit for adapting to electrical use a flame producing fuel-fed lamp comprising a post and a hollow lantern mounted on the post, said kit including:
   (A) adaptor means comprising
      (i) a chamber defining a non-opaque portion; and
      (ii) means for mounting said chamber on the post; and
   (B) illuminating means comprising
      (i) a fiber optic bundle having a first end configured and dimensioned to resemble a flame and a second end; and
      (ii) means for mounting said bundle on the lantern with said bundle second end aligned with said non-opaque chamber portion.

2. The kit of claim 1 wherein said chamber and said illuminating means are configured and dimensioned to be received within the post and within the lantern respectively.

3. The kit of claim 1 wherein said non-opaque chamber portion is disposed at the top of said chamber and said bundle second end is disposed at the bottom of said bundle.

4. The kit of claim 2 wherein said non-opaque chamber portion is disposed at the top of said chamber and said bundle second end is disposed at the bottom of said bundle.

5. The kit of claim 1 wherein said chamber mounting means comprises an outwardly extending lip of said chamber configured and dimensioned to extend over the top of said post, whereby said adaptor means is mountable upon the post without mechanical fasteners.

6. The kit of claim 2 wherein said chamber mounting means comprises an outwardly extending lip of said chamber configured and dimensioned to extend over the top of said post, whereby said adaptor means is mountable upon the post without mechanical fasteners.

7. The kit of claim 6 wherein said lip is of lesser diameter than the top of said post.

8. The kit of claim 4 wherein said lip is of lesser diameter than the top of said post.

9. The kit of claim 1 wherein the lantern includes a downwardly extending cylindrical portion of inner diameter D adapted to snugly fit over and around the top of the post, and said chamber has an outwardly extending lip of outer diameter D' adjacent the top thereof, where D is greater than D'.

10. The kit of claim 7 wherein the lantern includes a downwardly extending cylindrical portion of inner diameter D adapted to snugly fit over and around the top of the post, and said chamber has an outwardly extending lip of outer diameter D' adjacent the top thereof, where D is greater than D'.

11. The kit of claim 1 wherein the lantern has a base defining an aperture, and said bundle mounting means includes a non-opaque base having an adhesive backing on a portion thereof for securing said mounting means base to the lantern base with said bundle second end vertically aligned with the lantern base aperture, whereby said bundle mounting means is effective to mount said bundle in the lantern without mechnical fasteners.

12. The kit of claim 1 wherein said bundle first end is tapered inwardly and upwardly.

13. The kit of claim 1 wherein the periphery of said bundle first end is comprised of the end surfaces of optical fibers.

14. The kit of claim 1 wherein said bundle comprises a plurality of generally vertically extending optical fibers and said bundle upper end is substantially tapered and the ends of said fibers being exposed at said tapered end of said bundle.

15. The kit of claim 1 wherein said bundle comprises a plurality of generally vertically extending optical fibers and said bundle upper end is substantially shaped to simulate a flame, the ends of said fibers being exposed at said shaped end of said bundle.

16. The kit of claim 1 wherein said adaptor means additionally includes an electric light socket mounted within said chamber and means for electrically connecting said socket to an electrical power supply.

17. A lamp comprising
   (A) a longitudinally extending frame;
   (B) a light source mounted adjacent one end of said frame; and
   (C) a longitudinally extending bundle of optical fibers parallel-oriented for their entire length mounted adjacent the other end of said frame, one end of said bundle being operatively aligned with said light source and the other end of said bundle being substantially tapered upwardly and inwardly and the ends of said fibers being exposed at said tapered end of said bundle.

18. A lamp comprising
   (A) a longitudinally extending frame;
   (B) a light source mounted adjacent one end of said frame; and
   (C) a longitudinally extending bundle of optical fibers parallel-oriented for their entire length mounted adjacent the other end of said frame, one end of said bundle being operatively aligned with said light source and the other end of said bundle being shaped to simulate a flame, the ends of said fibers being exposed at said shaped end of said bundle.

19. A flame-simulating optical element comprising a longitudinally extending bundle of parallel-oriented optical fibers, one end of said bundle being adapted to be exposed to a light source, the other end of said bundle being substantially tapered upwardly and inwardly and the fibers having their ends exposed at said tapered end of said bundle.

20. A flame-simulating optical element comprising a longitudinally extending bundle of optical fibers parallel-oriented for their entire length, one end of said bundle being adapted to be exposed to a light source, the other end of said bundle being shaped to simulate a flame, the ends of said fibers being exposed at said shaped end of said bundle.

21. A kit for adapting to electrical use a flame-producing fuel-fed lamp comprising a post, said kit comprising a fiber-optic bundle the fibers of which have first and second ends, said bundle being shaped at one end to simulate a flame and said first ends of said fibers being then exposed, means for mounting the other end of said bundle on said post, and means for electrically illuminating said second ends of said fibers.

22. The kit of claim 21, wherein said lamp comprises a lantern portion on said post, said bundle-mounting means locating said one end of said bundle in said lantern portion.

23. The kit of claim 22 wherein said post is hollow, said illuminating means being adapted to be received in said post.

24. The kit of claim 21, said post being hollow, said illuminating means being adapted to be received in said post.

25. The lamp of claim 17 wherein, for at least some of said fibers, the exposed ends thereof have a surface area greater than the other ends thereof.

26. A lamp comprising
(A) a longitudinally extending frame;
(B) a light source mounted adjacent one end of said frame; and
(C) a longitudinally extending bundle of parallel-oriented optical fibers mounted adjacent the other end of said frame, one end of said bundle being operatively aligned with said light source and the other end of said bundle being shaped to simulate a flame, the ends of said fibers being exposed at said shaped end of said bundle and the exposed ends of at least some of said fibers having a greater surface area than the other ends.

27. The element of claim 19 wherein, for at least some of said fibers, the exposed ends thereof have a greater surface area than the other ends.

28. A flame-simulating optical element comprising a longitudinally extending bundle of parallel-oriented optical fibers, one end of said bundle being adapted to be exposed to a light source, the other end of said bundle being shaped to simulate a flame, the ends of said fibers being exposed at said shaped end of said bundle and the exposed ends of at least some of said fibers having a greater surface area than the other ends.

* * * * *